J. A. WESENER.
METHOD OF IMPROVING THE CONDITION OF FLOUR.
APPLICATION FILED FEB. 19, 1913.
1,071,977.
Patented Sept. 2, 1913.
2 SHEETS—SHEET 1.
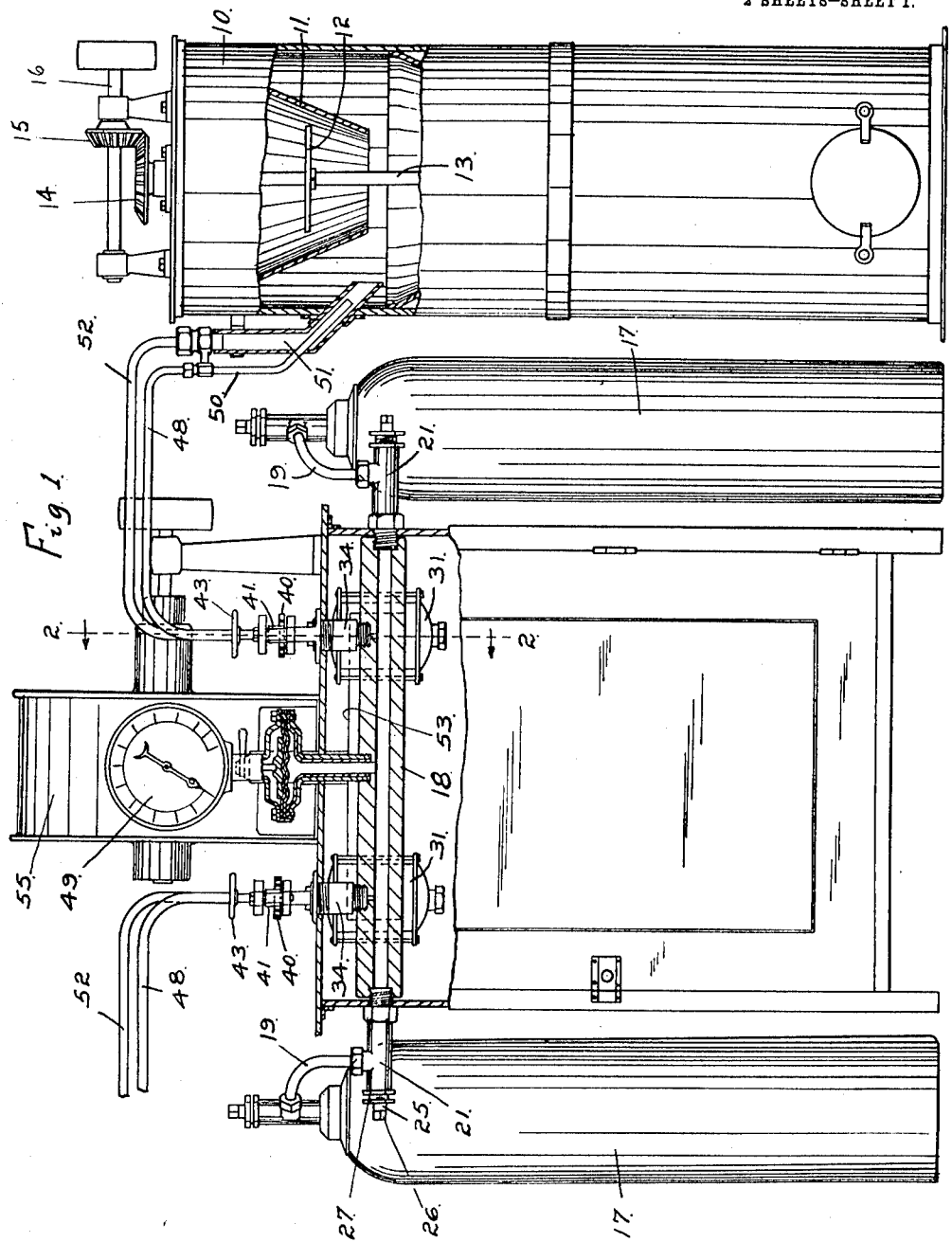
WITNESSES:
H M Gillespie
P K Truman
INVENTOR.
John A. Wesener
BY Barnett & Truman
ATTORNEYS J. A. WESENER.
METHOD OF IMPROVING THE CONDITION OF FLOUR.
APPLICATION FILED FEB. 19, 1913.
1,071,977.
Patented Sept. 2, 1913.
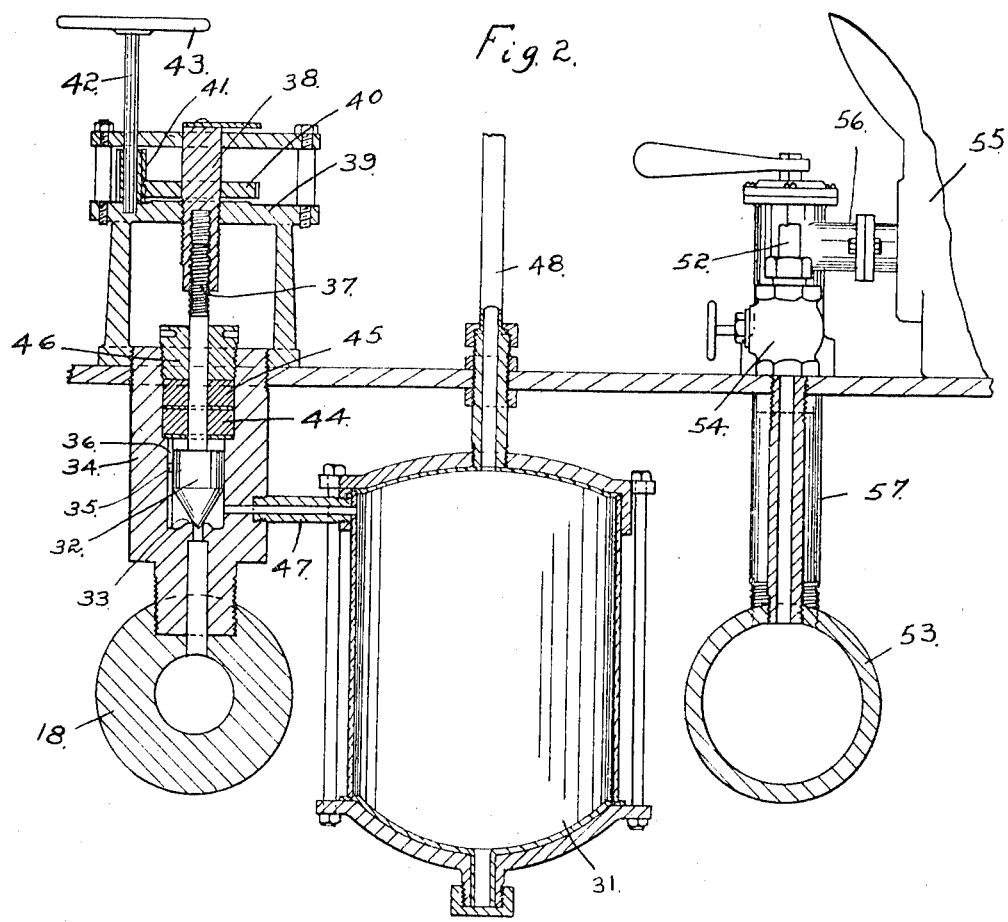
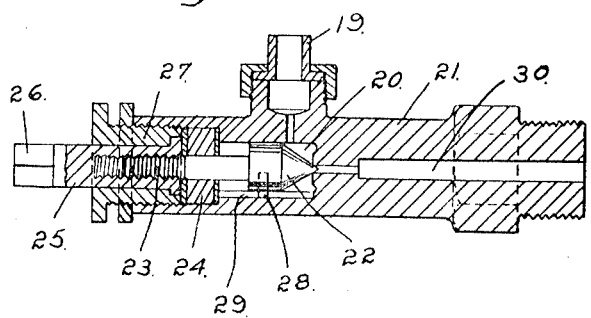
WITNESSES:
H. M. Gillespie.
P. H. Truman.
INVENTOR.
John A. Wesener
BY Barnett & Truman
ATTORNEYS

UNITED STATES PATENT OFFICE.

JOHN ALFONZO WESENER, OF CHICAGO, ILLINOIS.

METHOD OF IMPROVING THE CONDITION OF FLOUR.

1,071,977.  Specification of Letters Patent.  Patented Sept. 2, 1913.

Application filed February 19, 1913. Serial No. 749,493.

*To all whom it may concern:*

Be it known that I, JOHN A. WESENER, a citizen of the United States, residing at Chicago, in the county of Cook and State of Illinois, have invented certain new and useful Improvements in Methods of Improving the Condition of Flour, of which the following is a specification.

My invention relates to a method of treating flour to remove the color therefrom, "shorten" the same, and generally produce an improvement in its quality and condition whereby, when used for baking bread, for example, a whiter loaf is produced and one having greater volume, lightness of texture and a more uniform porosity than is possible to obtain by the use of untreated flour. These results, to a certain extent at least, can be produced by keeping the flour for several months after grinding and allowing it to "mature" naturally.

The present invention has to do with a method of artificially maturing and conditioning flour in which all of the advantages of natural maturing are obtained, in an increased degree, without the waste of time involved in natural maturing and without the deleterious effects and other disadvantages incident to certain artificial aging and so-called "bleaching" methods heretofore employed or suggested in the development of this art.

The present invention contemplates the use of chlorin gas to effect the maturing or aging of the flour. It has been known for some time that chlorin will bleach or whiten wheat flour, but it has always been supposed that the gas, if used for this purpose, would have a deleterious effect on the baking quality of the flour by injuring the gluten. I have discovered that if the chlorin be properly applied to the flour it has a very beneficial effect on its baking qualities instead of the deleterious effect generally supposed.

The conclusion that chlorin gas injures the baking qualities of wheat flour and hence is not a practical bleaching agent, is due, I believe, to a misapprehension which has prevailed as to the character of the reaction which takes place when chlorin is brought into contact with the flour, and the failure of the attempts to use the gas in this connection has resulted from the methods used in applying it, erroneously selected because of the misapprehension as to the reactions in question. It has generally been supposed, reasoning from the analogy of the action of chlorin and other bleaching agents in the bleaching of textile fabrics, for example, that the agents used for whitening the flour act as oxidizing agents freeing nascent oxygen which unites with or consumes the coloring matter in the flour. In oxidizing reactions moisture of course is essential. I have come to the conclusion, after considerable experimentation, that these reactions are not oxidizing processes at all but that the chemical agents used form addition compounds with colored terpene bodies in the flour $(C_{10}H_{16})^n$, resulting in the production of colorless salts. If chlorin be used the compounds are chlorids. Chlorin, furthermore, acts upon the gluten in the flour, the action being apparently hydrolytic, splitting the gluten up and making it more elastic and pliable. In fact, chlorin has much the same effect on the gluten as the enzyme of the yeast cell. As a result, a loaf of bread baked from the treated flour will have greater volume and more uniform porosity than one made from untreated flour.

In order to use chlorin gas for maturing flour (and incidentally bleaching it) the gas must be applied to the flour in the proper quantities which will vary in accordance with the kind and grade of flour treated. The gas must, moreover, be substantially anhydrous. It should also be substantially free from impurities and acids. If the gas contains any substantial amount of moisture, such an amount, for example, as chlorin gas generated by any of the ordinary methods will contain, it has the deleterious effect on the gluten remarked by prior experimenters in the use of this agent. As a matter of fact the chlorin will, in all probability, act as an oxidizing agent, but injuriously not beneficially, if there is any considerable degree of moisture present.

Moreover, the presence of moisture results in the production of hydrochloric acid which is extremely harmful to the flour. These facts probably account for the failure of earlier experimenters to get satisfactory results from the employment of chlorin in this connection. It is also necessary that the agent be applied to the flour in quantities which will be varied according to the character of the flour treated but must be substantially uniform for any particular kind and grade of flour. Therefore it is impractical to generate chlorin gas according to any of the ordinary methods used at the present time and apply it, as generated, to the flour because these methods of generating the gas, besides giving a moist gas and one which contains acids and impurities, preclude the possibility of the close regulation necessary in order that the gas can be brought into contact with the flour at the uniform and controllable rate which is essential to success. For example, if chlorin is generated by electrolysis by blowing air through an electrolytic solution, the volume of the gas will be greater when the solution is strong than when it is weak and at no time subject to any definite control. Besides this the air will blow over a considerable amount of moisture and free acids.

According to my process the treating gas is first liquefied, thoroughly dehydrated, and stored under pressure in containers. In practice the gas, when ready for use, does not contain more than two-tenths of one per cent. of moisture and in using the word "anhydrous" as describing the condition of the gas I intend a gas which does not contain a substantially greater percentage of moisture than that. It certainly should not contain more than three or four tenths of one per cent. moisture. The gas is supplied to the miller ready for use in these containers and is applied to the flour, which is passed through a closed chamber so as to be in suspension in the air, by means of a blast of air which is preferably applied to the stream of gas at the point the latter enters the treating chamber. If the gas is substantially dry, as above specified, the small amount of moisture that there may be in the flour and in the air used for applying the gas to the flour will not produce any deleterious effect on the flour. As the operation is performed in a mill the air used is ordinarily fairly dry. By applying it to the gas at the moment, or immediately before the gas comes into contact with the flour, even if the air contains some moisture the opportunity for the formation of acids is diminished.

In all the previous work which has been done in bleaching flour, both practical and experimental, difficulties have been experienced due to the corrosion of pipes and consequent tainting of the flour with the resultant metal salts. By using an anhydrous gas and by applying the air, which may contain traces of moisture, to the gas as the latter enters the treating chamber, the danger of the bad results of corrosion are entirely obviated. The amount of pure anhydrous chlorin gas which should be used to treat flour will vary, first, according to the amount of coloring matter in the flour, and, second, in accordance with the character and quantity of the gluten. Some flours contain more gluten than others, and in some flours the gluten is harsher and tougher than in others. Knowing the nature of the reactions taking place when the agent is brought into contact with flour, it is possible for any well instructed chemist, familiar with the analysis of wheat flour, to determine accurately the amount of the gas necessary for any particular grade of flour. I have found, as a result of a great many experiments with different grades of flour, that the amount of chlorin should not exceed one pound of the liquefied chlorin to five thousand pounds of flour, and should not be less than one pound of the chlorin to ten thousand pounds of the flour.

One of the advantages of my process as applied to flour is its convenience to the miller. Instead of having to manufacture the gas on the premises, as was contemplated by the earlier methods, the miller receives the gas ready to apply to the flour. Very little experience enables him to carry out the treatment of the flour and get uniform and certain results.

In the accompanying drawings I have shown a preferred form of apparatus for carrying out my process, no claim being made, however, to the apparatus as the apparatus is made the subject of a separate application Serial No. 752,400, filed March 6, 1913.

In the drawings, Figure 1 shows a side elevation, with parts broken away, of the apparatus, the treating chamber being shown on a more reduced scale than the rest of the apparatus; Fig. 2, a sectional view taken on line 2—2 of Fig. 1, and Fig. 3, a vertical section through the shut-off valve between one of the gas tanks and the gas manifold.

Like characters of reference designate like parts in the several figures of the drawings.

Referring to the drawings, 10 designates a closed vessel in which the flour or other material is treated. The flour falls through this vessel from top to bottom, being preferably kept in agitation by some suitable means. For example, I have shown the interior of the vessel provided with a series of funnel-like members 11 in which are disks 12 arranged on a vertical shaft 13 which is revolved by means of the bevel gears 14, 15 and drive shaft 16. The liquefied chlorin is stored in tanks 17 which, when exhausted, are removed and replaced by fresh tanks. In the apparatus shown two tanks are connected to opposite ends of a pipe or manifold 18, each end of the manifold being provided with a shut-off valve (Fig. 3) so that by drawing the chlorin from the tanks alternately the treatment of the flour need not be interrupted. The chlorin passes from the tanks 17 through pipes 19 into the valve chamber 20 formed in the fittings 21 which are secured to opposite ends of the pipe 18. The supply, in each case, is shut off by a needle valve 22 which has a threaded stem 23 projecting through packing 24 and into a threaded bore in the spindle 25 which is provided with a squared end 26 for the application of a wrench. The spindle 25 is held in place but with capacity for rotation, by a bushing 27 in the end of the fitting 21. The valve 22 has a stud 28 which travels in a guide slot 29 in the valve chamber 20. A duct 30 leads from the valve chamber 20 through the fitting to the pipe 18.

The gas from the pipe 18 passes preferably into a vessel 31 before it goes to the flour treating chamber. The purpose of this vessel is simply to insure a certain amount of pressure behind the gas in the pipes leading to the treating chamber and its use is optional. The quantity of gas out-flowing from the manifold 18 is controlled by a needle valve 32 operating against a seat 33 in the valve casing 34, which latter is threaded into the pipe 18. The valve 32 has a very delicate adjustment so that the amount of gas delivered from the pipe 18 may be very accurately determined. The valve is provided with a stud 35 which works in a guide slot 36. The upper portion 37 of the stem of the valve is threaded into a spindle 38 exteriorly threaded and mounted in a frame 39. The spindle 38 carries a gear 40 meshed by a pinion 41 on a shaft 42 provided with a hand wheel 43. The stem 37 passes through a rubber bushing 44 and a brass bushing 45 which are held in place by a nut 46. The gas which passes valve 32 enters the pressure chamber 31 through a pipe 47 and is conducted from the pressure chamber to the treating vessel 10 through a pipe 48. Preferably the apparatus is constructed so as to have two or more treating chambers. If there are two, as contemplated by the apparatus shown in the drawings, there will be two pressure chambers 31 and two gas pipes 48. A pressure gage 49 is tapped into the gas manifold 18. By noting the pressure in the gas manifold the amount of gas delivered to the treating chamber may be accurately determined by a proper adjustment of valve 32. The gas pipe 48 terminates in an angular nozzle 50, the end of which extends through the air nozzle 51 which projects into the treating chamber 10 and is connected by a pipe 52 with the air manifold 53, pipe 52 being provided with shut-off valve 54. A blower 55 supplies air to the air manifold 53 through pipe connections 56, 57. The gas, by this arrangement, is not mixed with the air until just before entering the treating chamber. It enters the chamber through a downwardly inclined pipe or nozzle. The stream of gas is surrounded by a stream of air so that a thorough mixing takes place. Chlorin gas being heavier than air, there is no danger that the gas will back up into the air line and destroy or injure the valves, blower or other parts of the apparatus likely to be affected by gas of this sort.

While the above described apparatus, after considerable experiment, has been adopted as the best apparatus for carrying out my process, it will be understood that the process might be practised by apparatus somewhat differently constructed.

I claim:

1. The method of treating flour to mature and whiten it which consists in causing a stored quantity of liquefied anhydrous chlorin to be gradually vaporized and bringing the vapor diluted with an inactive gas into contact with the flour.

2. The method of treating flour to mature and whiten it which consists in causing a stored quantity of liquefied anhydrous chlorin to be gradually vaporized and bringing the vapor diluted with an inactive gas into contact with the flour, said inactive gas being mixed with the chlorin gas at the place of application of the latter to the flour.

3. The method of treating flour to mature and whiten it, which consists in causing a stored quantity of liquefied anhydrous chlorin to be gradually vaporized and bringing the vapor diluted with an inactive gas into contact with the flour in the proportion of one pound of the chlorin to from 5000 to 10,000 pounds of the flour.

4. The method of treating flour to mature and whiten it which consists in bringing into contact therewith chlorin gas in an anhydrous state diluted with an inactive gas.

5. The method of treating flour to mature and whiten it which consists in bringing into contact therewith chlorin gas in an anhydrous state diluted with an inactive gas in the proportion of one pound of the chlorin to from 5000 to 10,000 pounds of the flour.

6. The method of treating flour to mature and whiten it, which consists in causing a stored quantity of liquefied chlorin to be gradually vaporized and bringing the vapor diluted with an inactive gas into contact with the flour.

7. The method of treating flour to mature and whiten it which consists in causing a stored quantity of liquefied chlorin to be gradually vaporized and bringing the vapor diluted with an inactive gas into contact with the flour in the proportion of one pound of the chlorin to from 5000 to 10,000 pounds of the flour.

JOHN ALFONZO WESENER.

Witnesses:
L. A. FALKENBERG,
G. Y. SKINNER.